United States Patent
Yokota

(10) Patent No.: US 9,604,636 B2
(45) Date of Patent: Mar. 28, 2017

(54) TURNING CHARACTERISTIC ESTIMATING DEVICE FOR VEHICLE

(75) Inventor: Takahiro Yokota, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 398 days.

(21) Appl. No.: 14/380,614

(22) PCT Filed: Feb. 24, 2012

(86) PCT No.: PCT/JP2012/054657
§ 371 (c)(1),
(2), (4) Date: Aug. 22, 2014

(87) PCT Pub. No.: WO2013/125047
PCT Pub. Date: Aug. 29, 2013

(65) Prior Publication Data
US 2015/0291156 A1    Oct. 15, 2015

(51) Int. Cl.
*B60W 30/02* (2012.01)
*B60W 30/045* (2012.01)
*B60W 40/12* (2012.01)
*B60W 40/114* (2012.01)
*B60T 8/1755* (2006.01)
*B60W 30/18* (2012.01)

(52) U.S. Cl.
CPC ....... *B60W 30/045* (2013.01); *B60T 8/17551* (2013.01); *B60W 30/18145* (2013.01); *B60W 40/114* (2013.01); *B60W 40/12* (2013.01); *B60W 30/02* (2013.01)

(58) Field of Classification Search
CPC combination set(s) only.
See application file for complete search history.

(56) References Cited

U.S. PATENT DOCUMENTS

| 8,515,591 B2 | 8/2013 | Yokota |
| 8,744,686 B2 | 6/2014 | Yokota |
| 2004/0002795 A1 | 1/2004 | Tanimoto et al. |

(Continued)

FOREIGN PATENT DOCUMENTS

| EP | 1 375 281 A1 | 1/2004 |
| JP | 2004-26073 A | 1/2004 |

(Continued)

OTHER PUBLICATIONS

International Search Report Issued Apr. 24, 2012 in PCT/JP12/054657 Filed Feb. 24, 2012.

*Primary Examiner* — Huan Tran
(74) *Attorney, Agent, or Firm* — Oblon, McClelland, Maier & Neustadt, L.L.P.

(57) ABSTRACT

A turning-characteristic estimating unit of an ECU estimates a stability factor and a steering-response time constant coefficient that are parameter values related to turning characteristics of a vehicle. A standard yaw rate of the vehicle is calculated using the estimation values of the stability factor and the steering-response time constant coefficient estimated by the turning-characteristic estimating unit. A validity determining unit of the ECU determines the validity of the estimation values based on the standard yaw rate and an actual yaw rate of the vehicle. This allows improving the estimation accuracy of the stability factor and the steering-response time constant coefficient.

20 Claims, 8 Drawing Sheets

(56) References Cited

U.S. PATENT DOCUMENTS

| | | | | |
|---|---|---|---|---|
| 2012/0173039 A1* | 7/2012 | Yokota | ................... | B60W 40/11 |
| | | | | 701/1 |
| 2012/0173040 A1* | 7/2012 | Yokota | ................... | B60W 40/11 |
| | | | | 701/1 |
| 2015/0291156 A1* | 10/2015 | Yokota | ................... | B60W 40/12 |
| | | | | 702/145 |

FOREIGN PATENT DOCUMENTS

| | | |
|---|---|---|
| JP | 2004 26074 | 1/2004 |
| JP | 2005 8066 | 1/2005 |
| JP | 5024456 | 9/2012 |
| JP | 5041069 | 10/2012 |
| WO | 2011 036820 | 3/2011 |
| WO | 2011 036821 | 3/2011 |
| WO | WO 2013/088580 A1 | 6/2013 |

* cited by examiner

TURNING CHARACTERISTIC ESTIMATING DEVICE FOR VEHICLE

FIELD

The present invention relates to a turning characteristic estimating device for a vehicle.

BACKGROUND

Conventionally, there is a known technique that stabilizes the behavior of a vehicle such as an automobile during turning. For example, this technique sets the control amount corresponding to the deviation between a standard turning state quantity (a standard yaw rate) and an actual turning state quantity (an actual yaw rate), so as to perform a turning control. The standard turning state quantity (the standard yaw rate) is calculated based on a stability factor, a time constant coefficient of steering response, and similar parameter value that are parameter values related to turning characteristics. The stability factor, the time constant coefficient of steering response, and similar parameter value are changed depending on conditions such as the number of occupants and the superimposed load of the vehicle during running. For example, Patent Literatures 1 and 2 disclose techniques for estimating these parameter values based on an actual yaw rate, a lateral acceleration, a vehicle speed, and similar parameter during running.

CITATION LIST

Patent Literature

Patent Literature 1: .Japanese Patent Application Laid-open No. 2005-008066
Patent Literature 2: .Japanese Patent Application Laid-open No. 2004-026074

SUMMARY

Technical Problem

However, in the above-described conventional technique, there is room for further improving the estimation accuracy of the turning characteristics (the stability factor and the time constant coefficient of steering response).

The present invention has been made in view of the above-described circumstances, and it is an object of the present invention to provide a turning characteristic estimating device for a vehicle that can improves the estimation accuracy of the turning characteristics (the stability factor and the time constant coefficient of steering response).

Solution to Problem

In order to achieve the above mentioned object, in a turning characteristic estimating device for a vehicle according to the present invention for estimating a stability factor and a time constant coefficient of steering response that are parameter values related to turning characteristics of the vehicle, the turning characteristic estimating device determines validity of estimation values based on a standard yaw rate of the vehicle and an actual yaw rate of the vehicle, the standard yaw rate being calculated by using estimation values of the stability factor and the time constant coefficient of steering response estimated by the turning characteristic estimating device.

Further, in the turning characteristic estimating device for a vehicle, it is preferable that the turning characteristic estimating device changes a changing operation on the stability factor and the time constant coefficient of steering response of the vehicle corresponding to a determination result of the validity of the estimation values.

Further, in the turning characteristic estimating device for a vehicle, it is preferable that at the time an absolute value of a deviation between the standard yaw rate and the actual yaw rate is equal to or less than a predetermined value, the turning characteristic estimating device determines that the estimation values are valid.

Further, in the turning characteristic estimating device for a vehicle, it is preferable that at the time a correlation coefficient between the standard yaw rate and the actual yaw rate is equal to or more than a predetermined threshold value, the turning characteristic estimating device determines that the estimation values are valid.

Further, in the turning characteristic estimating device for a vehicle, it is preferable that at the time an absolute value of a deviation between a value obtained by a high-pass filter process on the standard yaw rate and a value obtained by a high-pass filter process on the actual yaw rate is equal to or less than a predetermined value, the turning characteristic estimating device determines that the estimation values are valid.

Further, in the turning characteristic estimating device for a vehicle, it is preferable that at the time a ratio between an integrated absolute value of a value obtained by a high-pass filter process on the standard yaw rate and an integrated absolute value of a value obtained by a high-pass filter process on the actual yaw rate is within a predetermined range, the turning characteristic estimating device determines that the estimation values are valid.

Further, in the turning characteristic estimating device for a vehicle, it is preferable that at the time the estimation values are determined to be valid, the turning characteristic estimating device updates the stability factor and the time constant coefficient of steering response of the vehicle with the estimation values, and at the time the estimation values are determined to be not valid, the turning characteristic estimating device resets the stability factor and the time constant coefficient of steering response of the vehicle to states before the turning characteristic estimating device estimates the estimation values used for determination of validity.

Further, in the turning characteristic estimating device for a vehicle, it is preferable that at the time an absolute value of a deviation between a value obtained by a high-pass filter process on the standard yaw rate and a value obtained by a high-pass filter process on the actual yaw rate is equal to or more than a predetermined value, the turning characteristic estimating device resets the stability factor and the time constant coefficient of steering response of the vehicle to initial values or updates the stability factor and the time constant coefficient of steering response of the vehicle to intermediate values between the estimation values and the initial values.

Further, in the turning characteristic estimating device for a vehicle, it is preferable that at the time a ratio between an integrated absolute value of a value obtained by a high-pass filter process on the standard yaw rate and an integrated absolute value of a value obtained by a high-pass filter process on the actual yaw rate is outside of a predetermined range, the turning characteristic estimating device resets the stability factor and the time constant coefficient of steering response of the vehicle to initial values or updates the stability factor and the time constant coefficient of steering response of the vehicle to intermediate values between the estimation values and the initial values.

Further, in the turning characteristic estimating device for a vehicle, it is preferable that at the time the estimation values are determined to be valid, the turning characteristic estimating device sets weighting to the estimation values corresponding to a degree of validity of the estimation values, and updates the stability factor and the time constant coefficient of steering response of the vehicle while reflecting the weighting.

In order to achieve the above mentioned object, in a turning characteristic estimating device for a vehicle according to the present invention for estimating a stability factor and a time constant coefficient of steering response that are parameter values related to turning characteristics of the vehicle, the turning characteristic estimating device changes the stability factor and the time constant coefficient of steering response of the vehicle based on a correlation relationship between a standard yaw rate of the vehicle and an actual yaw rate of the vehicle, the standard yaw rate being calculated by using estimation values of the stability factor and the time constant coefficient of steering response estimated by the turning characteristic estimating device.

Advantageous Effects of Invention

The turning characteristic estimating device for the vehicle according to the present invention can determine the validity of the estimation values of the stability factor and the time constant coefficient of steering response, so as to allow, for example, sorting out the estimation values by taking into consideration this determination result of the validity, thus providing an effect that can improve the estimation accuracy for the stability factor and the time constant coefficient of steering response.

DESCRIPTION OF EMBODIMENTS

Figure 1:
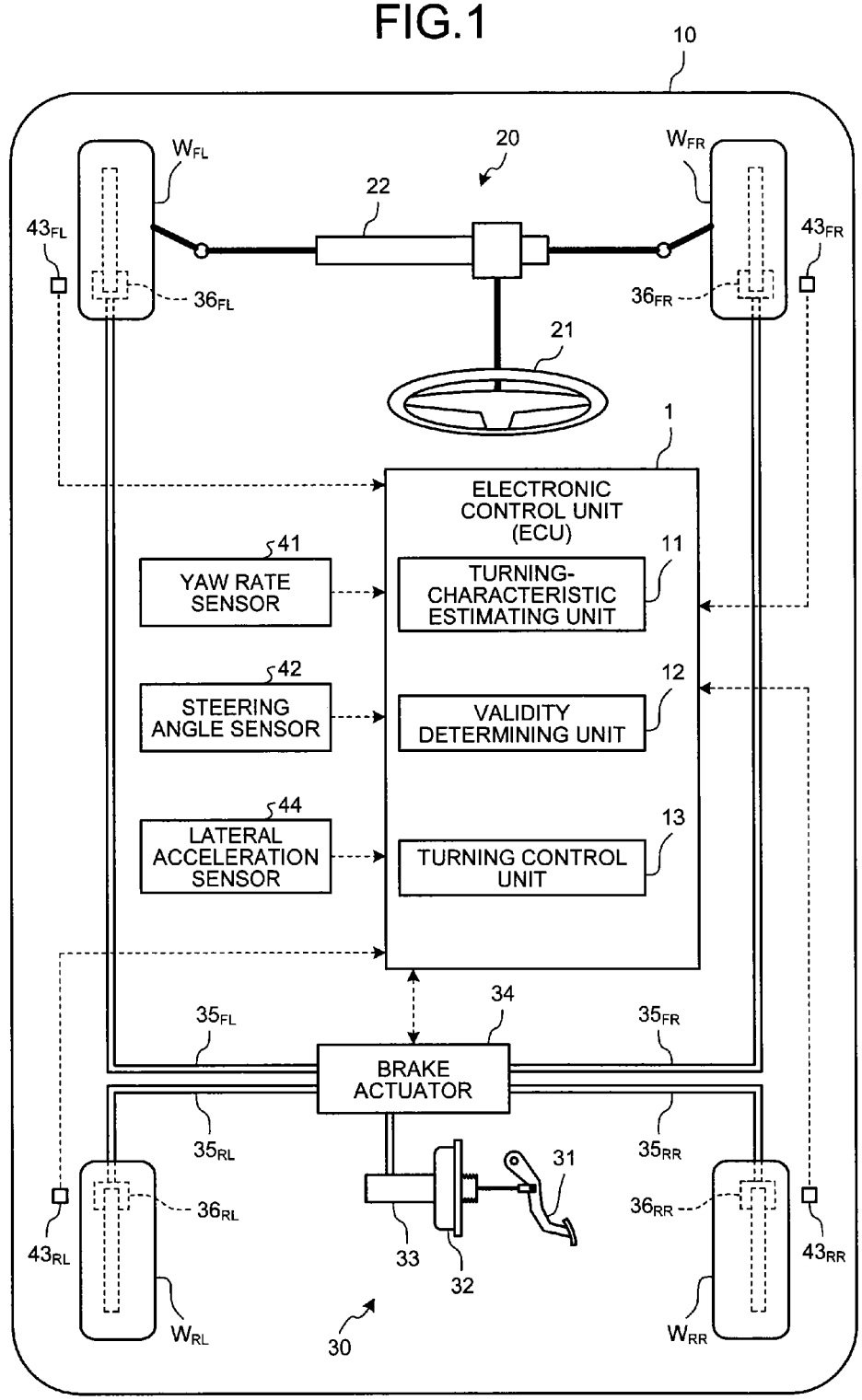
FIG. 1 is a diagram illustrating a schematic configuration of a vehicle to which a turning characteristic estimating device according to one embodiment of the present invention is applied.

Embodiments of a turning characteristic estimating device according to the present invention will be described hereinafter with reference to the drawings. In the following description, like reference numerals designate corresponding or identical elements throughout the embodiments, and therefore the descriptions of such elements will not be repeated.

[First Embodiment]

Firstly, a description will be given of the configuration of a turning characteristic estimating device according to a first embodiment of the present invention with reference to FIG. 1. FIG. 1 is a diagram illustrating a schematic configuration of a vehicle to which the turning characteristic estimating device according to this embodiment is applied.

The turning characteristic estimating device of this embodiment is applied to a vehicle 10. The vehicle 10 transmits the output (output torque) from a power source such as an engine and a motor (not illustrated) to drive wheels (for example, rear wheels $W_{RL}$ and $W_{RR}$) via a power transmission device such as a transmission, as a wheel driving force. The vehicle 10 may be any of a front-engine rear-drive (FR) car, a front-engine front-drive (FF) car, and a four-wheel drive vehicle, or may be a midship-engine or rear-engine vehicle or what is called a hybrid vehicle that includes both an engine and a motor as power sources of the vehicle 10.

This vehicle 10 includes a steering device 20 that turns front wheels $W_{FL}$ and $W_{FR}$ as steered wheels. This steering device 20 includes a steering wheel 21 and steering-angle providing means 22. The steering wheel 21 is a steering operator by the driver. The steering-angle providing means 22 is driven in association with the steering operation of this steering wheel 21. For example, the steering-angle providing means 22 is constituted by what is called a rack & pinion mechanism that includes a rack gear and a pinion gear (not illustrated).

This vehicle 10 includes a braking device 30 that decelerates or stops the vehicle body. This braking device 30 is constituted by a brake pedal 31, brake boosting means (a brake booster) 32, a master cylinder 33, brake-fluid-pressure adjusting means (hereinafter referred tows a "brake actuator") 34, respective brake-fluid-pressure pipings $35_{FL}$, $35_{FR}$, $35_{RL}$, and $35_{RR}$ for the wheels $W_{FL}$, $W_{FR}$, $W_{RL}$, and $W_{RR}$, and braking-force generating means $36_{FL}$, $36_{FR}$, $36_{RL}$, $36_{RR}$. The brake pedal 31 is operated by the driver. The brake boosting means 32 boosts the operating pressure (the pedal depressing force) in association with the brake operation input to this brake pedal 31 by the driver at a predetermined boost ratio. The master cylinder 33 converts the pedal depressing force boosted by this brake boosting means 32 into a brake fluid pressure (hereinafter referred to as a "master cylinder pressure") corresponding to the operation amount of the brake pedal 31. The brake actuator 34 regulates the master cylinder pressure directly or for each wheel. The brake fluid pressures through this brake actuator 34 are transmitted to the brake-fluid-pressure pipings $35_{FL}$, $35_{FR}$, $35_{RL}$, and $35_{RR}$. The braking-force generating means $36_{FL}$, $36_{FR}$, $36_{RL}$, and $36_{RR}$ receive respective supplies of the brake fluid pressures of these brake-fluid-pressure pipings $35_{FL}$, $35_{FR}$, $35_{RL}$, and $35_{RR}$ to generate respective braking forces to the wheel $W_{FL}$, $W_{FR}$, $W_{RL}$, and $W_{RR}$. The braking-force generating means $36_{FL}$, $36_{FR}$, $36_{RL}$, and $36_{RR}$ are each formed by, for example, a disc rotor and a caliper. This braking device 30 can generate braking force with mutually different magnitudes to the respective wheels $W_{FL}$, $W_{FR}$, $W_{RL}$, and $W_{RR}$. This braking-force control for each of the wheels $W_{FL}$, $W_{FR}$, $W_{RL}$, and $W_{RR}$ is achieved such that an electronic control unit 1 controls the brake actuator 34.

This vehicle 10 includes a yaw rate sensor 41, a steering angle sensor 42, wheel speed sensors $43_{FL}$, $43_{FR}$, $43_{RL}$, and $43_{RR}$, and a lateral acceleration sensor 44. The yaw rate sensor 41 detects a real yaw rate (an actual yaw rate) Yr of the vehicle 10. The steering angle sensor 42 detects a steering angle δ of the front wheels $W_{FL}$ and $W_{FR}$. The wheel speed sensors $43_{FL}$, $43_{FR}$, $43_{RL}$, and $43_{RR}$ detect respective wheel speeds of the wheels $W_{FL}$, $W_{FR}$, $W_{RL}$, and $W_{RR}$. The lateral acceleration sensor 44 detects an acceleration (lateral acceleration) Gy in the lateral direction of the vehicle 10. Various information detected by the yaw rate sensor 41, the steering angle sensor 42, the wheel speed sensors $43_{FL}$, $43_{FR}$, $43_{RL}$, and $43_{RR}$, and the lateral acceleration sensor 44 is input to the electronic control unit 1.

The electronic control unit (ECU) 1 is a control unit that controls the respective portions of the vehicle 10 based on various sensor information within the vehicle 10. In particular, the ECU 1 of this embodiment constitutes the turning characteristic estimating device as one function. The turning characteristic estimating device estimates the turning characteristics (a stability factor Kh and a steering-response time constant coefficient Tp) of the vehicle 10 based on the information detected by the yaw rate sensor 41, the steering angle sensor 42, the wheel speed sensors $43_{FL}$, $43_{FR}$, $43_{RL}$, and $43_{RR}$, and the lateral acceleration sensor 44, and performs update when the estimation values are valid.

The ECU 1 of this embodiment includes a turning-characteristic estimating unit 11, a validity determining unit 12, and a turning control unit 13 as respective functions of the turning characteristic estimating device.

The turning-characteristic estimating unit 11 estimates the stability factor Kh and the steering-response time constant coefficient Tp that are parameter values related to the turning characteristics of the vehicle 10, based on the information detected by the yaw rate sensor 41, the steering angle sensor 42, the wheel speed sensors $43_{FL}$, $43_{FR}$, $43_{RL}$, and $43_{RR}$, and the lateral acceleration sensor 44 and similar information. Here, a specific process for estimating the turning characteristics Kh and Tp by the turning-characteristic estimating unit 11 will be described later with reference to FIG. 2.

The validity determining unit 12 determines the validity of the turning characteristics (the stability factor Kh and the steering-response time constant coefficient Tp) estimated by the turning-characteristic estimating unit 11, so as to determine the action on the estimated turning characteristics Kh and Tp. The validity determining unit 12 determines the validity of the data related to the estimated turning characteristics during a turning operation of the vehicle immediately after the turning operation is ended, after a lapse of a predetermined time in the turning operation, or in similar case.

The validity determining unit 12 changes the changing operation for the estimation values of the turning characteristics Kh and Tp estimated by the turning-characteristic estimating unit 11 corresponding to the determination result of the validity. For example, in the case where the validity determining unit 12 determines that the estimation values of the turning characteristics are valid, the validity determining unit 12 updates the turning characteristics (Kh and Tp) of the vehicle in accordance with the estimation values of the turning characteristics estimated by the turning-characteristic estimating unit 11. In the case where it is determined that the estimation values of the turning characteristics are not valid, the validity determining unit 12 resets these estimation values to the previous values or the initial values. Here, the previous value is a turning characteristic of the vehicle that is held before the start of the turning operation related to the data used in the determination at this time of the validity. A specific validity determination process and a specific process for updating the turning characteristics by the validity determining unit 12 will be described later with reference to FIG. 2 to FIG. 6.

The turning control unit 13 uses the turning characteristics updated by the turning-characteristic estimating unit 11 and the validity determining unit 12 to control the movement of the vehicle 10 so as to stabilize the turning behavior of the vehicle 10. Specifically, the turning control unit 13 uses the stability factor Kh and the steering-response time constant coefficient Tp that are updated by the turning-characteristic estimating unit 11 and the validity determining unit 12 to calculate a standard yaw rate YrStd, so as to compare this standard yaw rate YrStd with the actual yaw rate Yr detected by the yaw rate sensor 41.

Here, the standard yaw rate YrStd is a target value of the yaw rate corresponding to the operating state during the turning operation of the vehicle 10. For example, the standard yaw rate YrStd can be calculated in accordance with, for example, the following formula (1) based on the vehicle speed V, lateral acceleration Gy, the steering angle δ, the stability factor Kh, and the steering-response time constant coefficient Tp.

$$YrStd = \frac{1}{1+TpVs}\left(\frac{V\delta}{L} - KhGyV\right) \qquad (1)$$

When the actual yaw rate Yr is larger than the standard yaw rate YrStd, the turning control unit 13 reduces the output of the power source and generates the braking force with respect to the turning outer wheel on the vehicle front side. When the actual yaw rate Yr is smaller than the standard yaw rate YrStd, the turning control unit 13 reduces the output of the power source and generates the braking force with respect to the turning inner wheel on the vehicle rear side. With respect to the wheel as the control target, a larger braking force is generated as the difference between the actual yaw rate Yr and the standard yaw rate YrStd becomes larger. Accordingly, this turning control unit 13 controls the turning posture of the vehicle 10 toward the stable direction.

The motion control of the vehicle 10 by the turning control unit 13 may be any control insofar as the motion control is for controlling the movement of the vehicle 10 based on the target yaw rate to be calculated using the estimation values of the stability factor Kh and the steering-response time constant coefficient Tp.

Here, the ECU 1 is physically an electronic circuit that mainly includes a well-known microcomputer. The well-known microcomputer includes a central processing unit (CPU), a random access memory (RAM), a read only memory (ROM), an interface, and similar member. The respective functions of the ECU 1 described above are achieved such that the application program held in the ROM is loaded to the RAM and then executed by the CPU so as to operate various devices within the vehicle under the control by the CPU and perform read and write of data in the RAM and the ROM.

Figure 2:
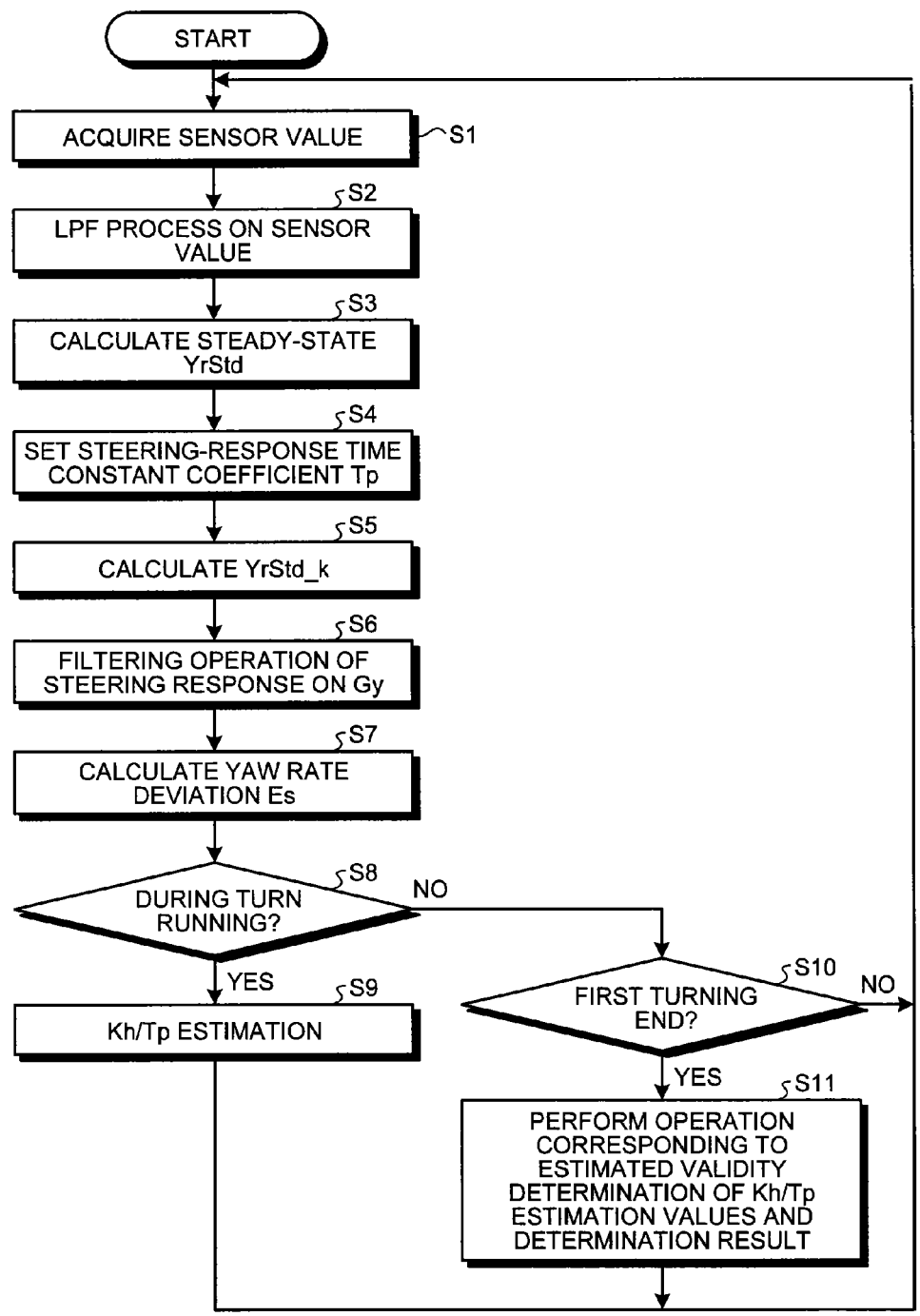
FIG. 2 is a flowchart illustrating a turning-characteristic estimating process in the one embodiment of the present invention.
Figure 3:
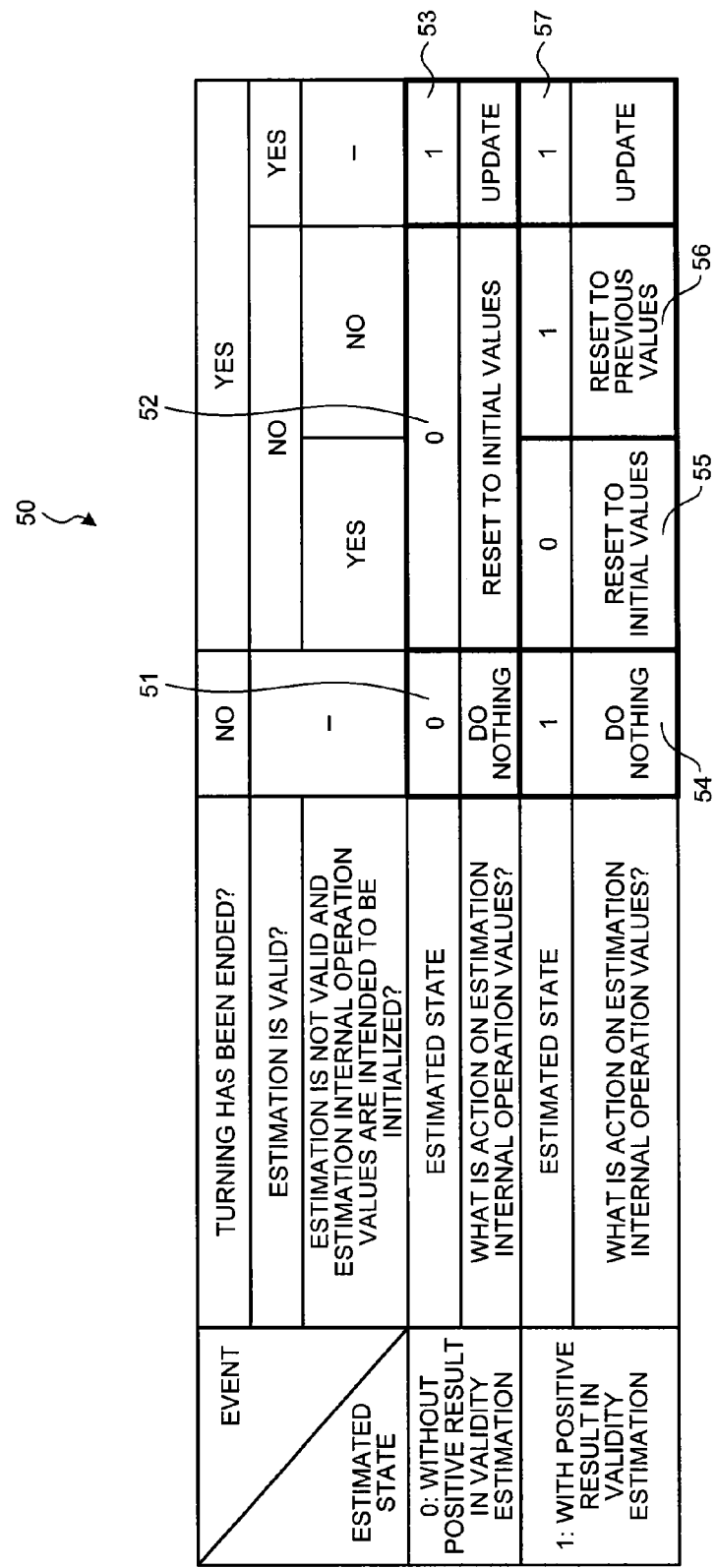
FIG. 3 is a diagram illustrating one example of a state transition table to be used in a process of step S11 in the flowchart of FIG. 2.
Figure 4:
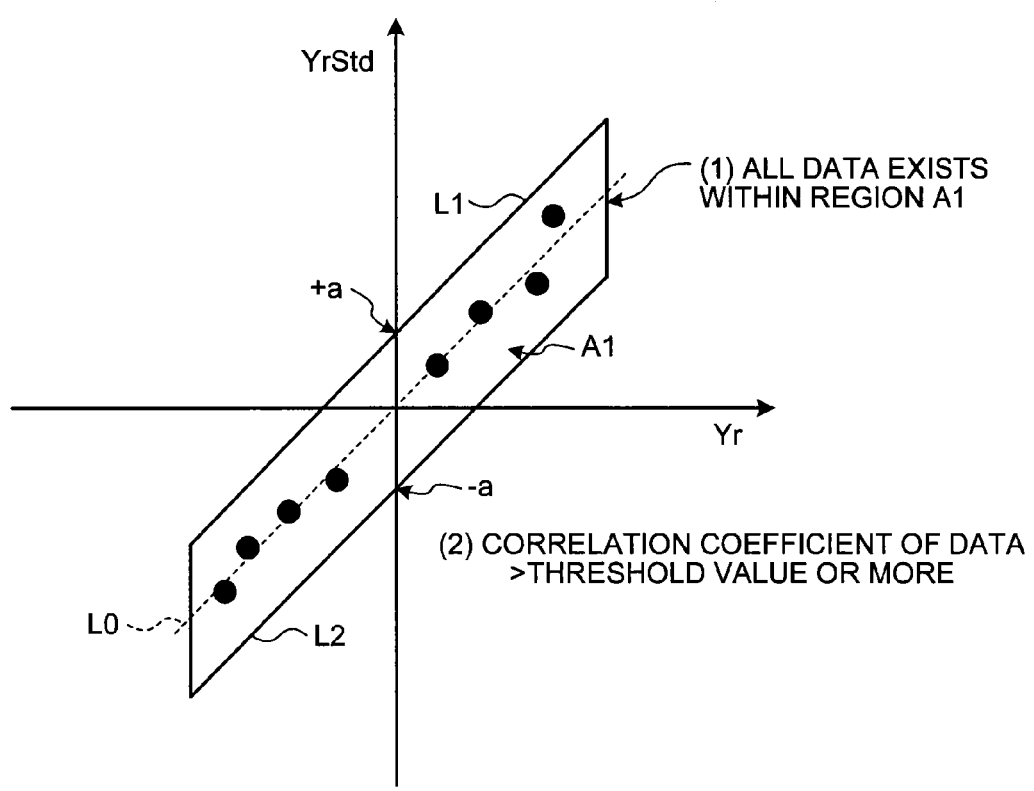
FIG. 4 is a diagram for explaining determination criteria in a determination event "ESTIMATION IS VALID?" on the state transition table of FIG. 3.
Figure 5:
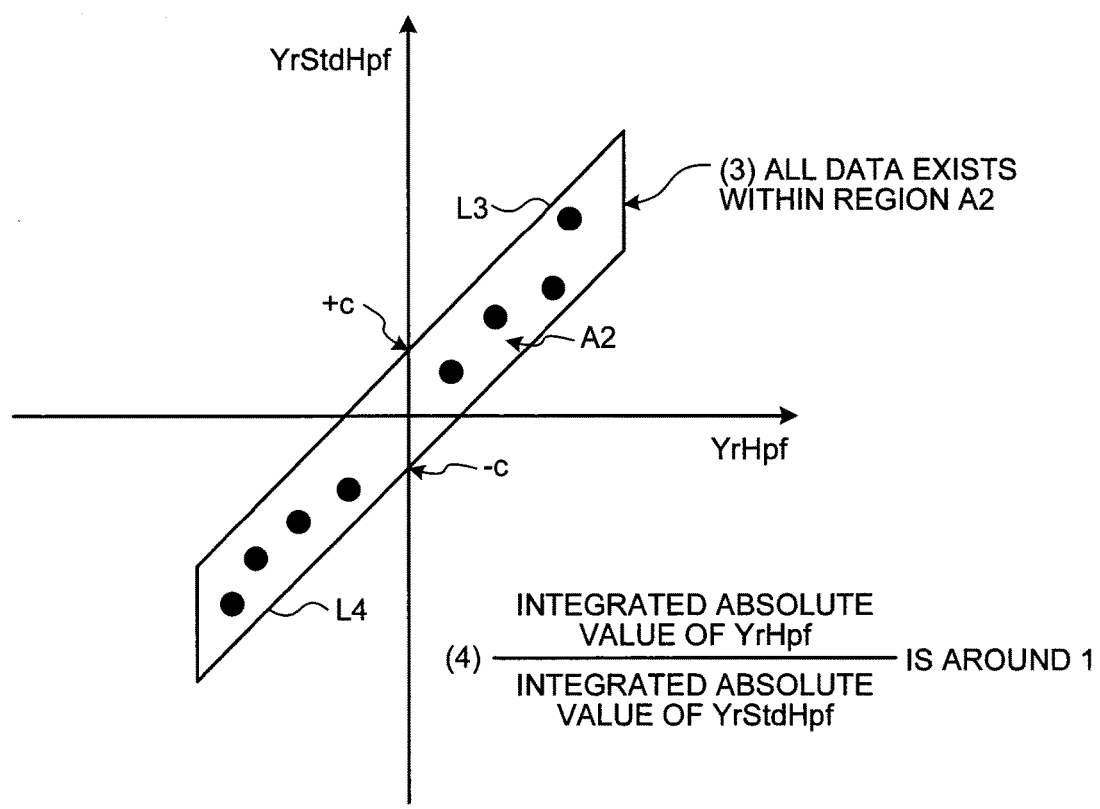
FIG. 5 is a diagram for explaining the determination criteria in the determination event "ESTIMATION IS VALID?" on the state transition table of FIG. 3.
Figure 6:
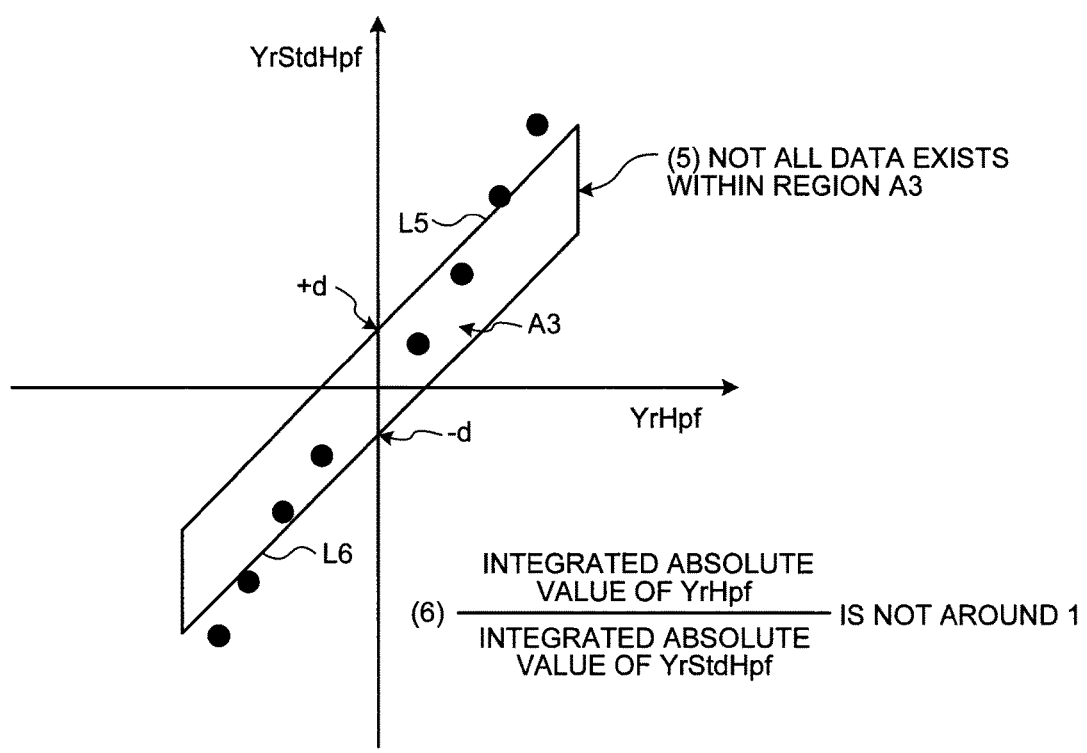
FIG. 6 is a diagram for explaining determination criteria in a determination event "ESTIMATION IS NOT VALID AND ESTIMATION INTERNAL OPERATION VALUES ARE INTENDED TO BE INITIALIZED?" on the state transition table of FIG. 3.

The following describes the operation of the turning characteristic estimating device according to this embodiment with reference to FIG. 2 to FIG. 6. FIG. 2 is a flowchart illustrating a turning-characteristic estimating process according to this embodiment. FIG. 3 is a diagram illustrating one example of a state transition table to be used in a process in step S11 in the flowchart of FIG. 2. FIG. 4 is a diagram for explaining determination criteria in a determination event "ESTIMATION IS VALID?" on the state transition table of FIG. 3. FIG. 5 is a diagram for explaining the determination criteria in the determination event "ESTIMATION IS VALID?" on the state transition table of FIG. 3. FIG. 6 is a diagram for explaining determination criteria in a determination event "ESTIMATION IS NOT VALID AND ESTIMATION INTERNAL OPERATION VALUES ARE INTENDED TO BE INITIALIZED?" on the state transition table of FIG. 3.

The process in the flowchart of FIG. 2 is performed, for example, after ignition is turned on by the ECU 1. As a premise when the flowchart of FIG. 2 is performed, the values of the stability factor Kh and the steering-response time constant coefficient Tp that are stored in the ECU 1 during ignition ON are set as an initial value Kh0 of Kh and an initial value Tp0 of Tp. These initial values Kh0 and Tp0 are values that are updated in the previous turning-characteristic estimating process and then stored in the ECU 1. Here, in the case where the ECU 1 does not have the stored values, the default set values are substituted for Kh0 and Tp0.

Firstly, the turning control unit 13 of the ECU 1 acquires the sensor values detected by the respective sensors from the yaw rate sensor 41, the steering angle sensor 42, the wheel speed sensors 43$_{FL}$, 43$_{FR}$, 43$_{RL}$, and 43$_{RR}$, the lateral acceleration sensor 44 (in S1).

A low-pass filter (LPF) process is performed on the sensor values acquired in step S1 for removing high-frequency noise (in S2). As the LPF process, for example, a first order LPF process at 3.4 [Hz] is performed. Using a known technique, a vehicle body speed is obtained from the sensor values of the wheel speed sensors 43$_{FL}$, 43$_{FR}$, 43$_{RL}$, and 43$_{RR}$ and a front-wheel steering angle is obtained from the sensor value of the steering angle sensor 42. As a result of the arithmetic processing, the front-wheel steering angle δ, the vehicle body speed V, the actual yaw rate Yr, and the lateral acceleration Gy are calculated. Here, the vehicle body speed V may be acquired using a vehicle speed sensor that detects the vehicle speed of the vehicle 10 as it is or similar sensor other than calculation based on the wheel speeds of the respective wheels.

Subsequently, the turning-characteristic estimating unit 11 of the ECU 1 computes the parameters to be used for estimation of the turning characteristics. Firstly, the standard yaw rate (a steady-state YrSTd_k) in a steady state is calculated in accordance with the following formula (2) (in S3). The steady-state YrSTd_k is used for estimation of the stability factor Kh.

$$\text{Steady-state YrStd\_k} = \frac{V\delta}{L} - Kh0GyV \qquad (2)$$

Here, L denotes a wheelbase of the vehicle body 10, and Kh0 denotes the initial value of the stability factor Kh that is set at the start of this procedure. Additionally, δ, V, and Gy denote the front-wheel steering angle, the vehicle body speed, and the lateral acceleration that are calculated in step S2.

Subsequently, the steering-response time constant coefficient Tp to be used in the process at this time is set (in S4). Here, Tp estimated in the previous loop in step S9 described later is substituted for this value. In the case where Tp has not been estimated yet in the process at this time, Tp0 is substituted for this value.

Using the steady-state YrStd_k calculated in step S3 and Tp set in step S4, the standard yaw rate (YrSTd_k) in a transient state is calculated in accordance with the following formula (3) (in S5). The standard yaw rate (YrSTd_k) in the transient state is used for estimation of the stability factor Kh.

$$\text{YrStd\_k} = \frac{1}{1+TpVs}\left(\frac{V\delta}{L} - Kh0GyV\right) \qquad (3)$$

Here, s is a Laplace operator.

Subsequently, using Tp set in step S4, a first order delay filtering operation of steering response is performed on the lateral acceleration Gy in accordance with the following (4) so as to calculate the lateral acceleration Gyf after the filtering process of steering response (in S6).

$$Gyf = \frac{1}{1+TpVs}Gy \qquad (4)$$

Subsequently, the deviation between the standard yaw rate YrStd_k and the actual yaw rate Yr is multiplied by L/V to calculate a front-wheel steering-angle equivalent value Es of the yaw rate deviation in accordance with the following formula (5) (in S7). The front-wheel steering-angle equivalent value Es is a value obtained by converting the deviation between the standard yaw rate YrSTd_k and the actual yaw rate Yr into a front-wheel steering-angle deviation.

$$Es = (\text{YrStd\_k} - Yr)\frac{L}{V} \qquad (5)$$

Subsequently, it is confirmed whether or not the vehicle 10 is in turn running (in S8). The turning characteristics (Kh and Tp) of the vehicle 10 to be estimated in this embodiment cannot be estimated unless the vehicle 10 is not in a turn running condition. Accordingly, the turning-characteristic estimating unit 11 confirms that the vehicle 10 is in a turn running condition before estimating the turning characteristics. Specifically, for example, in the case where the condition of the following formula (6) is satisfied, it can be determined that the vehicle 10 is in a turn running condition.

$$|\text{lateral acceleration } Gy| > 1.0 \, [\text{m/s}^2] \qquad (6)$$

Other than the above-described formula (6), the determination condition of the turn running may be a condition that a product YrV of the actual yaw rate Yr and the vehicle body speed V or the actual yaw rate Yr is equal to or more than a predetermined value. Alternatively, turning may be determined based on a slip state of the wheel.

In this embodiment, since one turning is set to the unit of the process for estimating the turning characteristics (see S9)

described later, it is determined whether or not the vehicle 10 is in turn running in this step. However, the unit of execution of the estimating process may be set to a turning integration time (for example, by minutes) and the determination condition in this step may be set to "A PREDETERMINED TIME HAS ELAPSED AFTER TURNING START?" or similar condition. In short, the determination condition in this step can be set to a lapse of a period that allows repeating the process in step S9 to the extent that sufficient data for determining the estimated validity of the turning characteristics in step S11 described later can be accumulated.

In the case where the turn-running determination condition of the formula (6) is satisfied and then the vehicle 10 is determined to be in turn running (Yes in S8), the process proceeds to step S9. In the case where the turn-running determination condition is not satisfied and then the vehicle 10 is determined to be not in turn running (No in S8), the process proceeds to step S10.

In the case where the vehicle 10 is determined to be turning in step S8 (Yes in S8), the turning-characteristic estimating unit 11 estimates the stability factor Kh and the steering-response time constant coefficient Tp that are the turning characteristics of the vehicle 10 (in S9).

Here, a description will be given of an estimation method for the stability factor Kh to be performed in step S9.

Firstly, a high-pass filter (HPF) process is performed on the lateral acceleration Gyf after the filtering process of steering response calculated in step S6 and the front-wheel steering-angle equivalent value Es of the yaw rate deviation calculated in step S7. Here, Gyf and Es are calculated based on the sensor values (the yaw rate Yr, the lateral acceleration Gy, and the front-wheel steering angle δ) as described above. The HPF process is performed on Gyf and Es to remove the influence of zero errors of these sensor values. As the HPF process, for example, a first order HPF process with a cutoff frequency of 0.2 [Hz] is performed. Since the low-pass filter process has already been performed on the sensor values in step S2, this HPF process causes a result similar to that of a band-pass filter process on Gyf and Es. Accordingly, Gyf and Es after the HPF process are respectively described as Gyfbpf and Esbpf.

Subsequently, an integrated value I_Gy of Gyfbpf and an integrated value I_Es of Esbpf are calculated. When Gyfbpf is a positive value, I_Gy and I_Es are calculated in accordance with the following formulas (7) and (8).

$$I\_Gy = \text{present } I\_Gy + Gyfbpf \tag{7}$$

$$I\_Es = \text{present } I\_Es + Esbpf \tag{8}$$

When Gyfbpf is a negative value, I_Gy and I_Es are calculated in accordance with the following formulas (9) and (10).

$$I\_Gy = \text{present } I\_Gy - Gyfbpf \tag{9}$$

$$I\_Es = \text{present } I\_Es - Esbpf \tag{10}$$

In this estimation method, Kh is estimated based on the gradient of Esbpf on the Gyfbpf-Esbpf plane. In the gradient calculation of Esbpf, since the influence of the zero errors of the sensor values is removed, the gradient of Esbpf is obtained by dividing the integrated value of Esbpf by the integrated value of Gyfbpf.

That is, the gradient of Esbpf on the Gyfbpf-Esbpf plane can be expressed as I_Es/I_Gy. Using this gradient, the estimation value of the stability factor Kh can be calculated in accordance with the following formula (11).

$$Kh = Kh0 + (I\_Es/I\_Gy)/L \tag{11}$$

The turning-characteristic estimating unit 11 temporarily stores the calculated estimation value of Kh in the ECU 1 to use the estimation value in a process in step S11 described later, the Tp estimation process in this step, or similar process. Additionally, the turning-characteristic estimating unit 11 temporarily stores the integrated value I_Gy of Gyfbpf and the integrated value I_Es of Esbpf in the ECU as "ESTIMATION INTERNAL OPERATION VALUES" that are parameters for determining the transition of the estimation value of Kh. The lateral acceleration Gyfbpf after the band-pass filter process and the front-wheel steering-angle equivalent value Esbpf of the yaw rate deviation are temporarily stored in the ECU 1 as elements of the estimation internal operation values.

Next, a description will be given of one example of the estimation method for the steering-response time constant Tp to be performed in step S9.

Firstly, five level values Tpn (n=1 to 5) are set in accordance with the following formulas (12) to (16) based on a Tp standard value and a predetermined standard value interval ΔTp.

$$Tp1 = Tp \text{ standard value} - 2\Delta Tp \tag{12}$$

$$Tp2 = Tp \text{ standard value} - \Delta Tp \tag{13}$$

$$Tp3 = Tp \text{ standard value} \tag{14}$$

$$Tp4 = Tp \text{ standard value} + \Delta Tp \tag{15}$$

$$Tp5 = Tp \text{ standard value} + 2\Delta Tp \tag{16}$$

Here, the Tp standard value can be set as the Tp initial value Tp0 in the process at this time or the estimation value of Tp in the previous loop. The standard value interval ΔTp may be a fixed value or may be varied corresponding to the state of progress of the estimation. The number n of the level values may be any numerical value other than five.

Next, for each of the five level values Tpn, the standard yaw rate YrStdn (n=1 to 5) in the transient state is calculated in accordance with the following formula (17). The standard yaw rate YrStdn is used for estimation of the steering-response time constant Tp.

$$YrStdn = \frac{1}{1 + TpnVs}\left(\frac{V\delta}{L} - KhGyV\right) \tag{17}$$

Here, Kh denotes the estimation value of Kh estimated in the previous loop. In the case where Kh has not been estimated yet in the process at this time, the initial value Kh0 is substituted for Kh.

Subsequently, a high-pass filter (HPF) process is performed on the actual yaw rate Yr calculated in step S2 and the standard yaw rate YrStdn. Here, Yr is the sensor value and YrStdn is calculated based on the sensor values (the vehicle speed V, the lateral acceleration Gy, and the front-wheel steering angle δ) as described above. The HPF process is performed to remove the influence of the zero errors of these sensor values. As the HPF process, for example, a first order HPF process with a cutoff frequency of 0.2 [Hz] is performed. Since the low-pass filter process has already been performed on the sensor values in step S2, this HPF process causes a result similar to that of a band-pass filter process on Yr and YrStdn. Accordingly, Yr and YrStdn after the HPF process are respectively described as Yrbpf and YrStdbpfn (n=1 to 5).

Subsequently, a yaw rate deviation Esn (n=1 to 5) is calculated in accordance with the following formula (18). The yaw rate deviation Esn is obtained by converting the difference absolute value between Yrbpf and YrStdbpf into a front-wheel steering angle.

$$Esn = |YrStdbpfn - Yrbpf|\frac{L}{V} \quad (18)$$

Regarding Esn calculated by the formula (18), an integrated value I_Esn (n=1 to 5) is calculated in accordance with the following formula (19).

$$I\_Esn = \text{present } I\_Esn + Esn \quad (19)$$

Among the five integrated values I_Es1 to I_Es5 of the yaw rate deviation calculated by the formula (19), a minimum value I_Esm (m is any of 1 to 5) is determined. Then, a steering-response time constant coefficient Tpm corresponding to the minimum value I_Esm of the integrated value of the yaw rate deviation is set as the estimation value of the steering-response time constant coefficient Tp.

The turning-characteristic estimating unit 11 temporarily stores the calculated estimation value of Tp in the ECU 1 to use the estimation value in the process in step S11 described later, the process in step S4 in the next loop, or similar process. Additionally, the turning-characteristic estimating unit 11 temporarily stores the integrated values I_Esn (n=1 to 5) of the yaw rate deviation corresponding to the five level values Tpn in the ECU 1 as "estimation internal operation values" that are parameters for determining the transition of the estimation value of Tp. Additionally, the turning-characteristic estimating unit 11 temporarily stores the yaw rate deviations Esn (n=1 to 5) corresponding to the five level values Tpn in the ECU 1 as elements of the estimation internal operation values.

As described above, the process for estimating the stability factor Kh and the steering-response time constant coefficient Tp to be performed in step S9 has been specifically described. Here, a known estimation method that is different from the above-described method may be applied insofar as the process for estimating the turning characteristics (Kh and Tp) in this step can estimate the stability factor Kh and the steering-response time constant coefficient Tp.

After the process for estimating the stability factor Kh and the steering-response time constant coefficient Tp, the turning-characteristic estimating unit 11 temporarily holds the estimation values of these parameters in the ECU 1. Then, the process returns to step S1 and continues. With steps S8 and S9, the turning-characteristic estimating process in step S9 is repeatedly performed during turn running of the vehicle 10, so as to hold the estimation values of the turning characteristics calculated in each loop in the ECU 1.

On the other hand, in the case where the vehicle 10 is determined to be not turning in step S8 (No in S8), subsequently, it is confirmed whether or not the process loop is the first process loop after the end of the turning (in S10). In the case where the process loop is the first process loop after the end of the turning (Yes in S10), the process proceeds to step S11. In the case where the process loop is not the first process loop after the end of the turning (No in S10), the process returns to step S1 and continues.

In the case where it is determined that the process loop is the first process loop after the end of the turning in step S10 (Yes in S10), the validity determining unit 12 determines the estimated validity of the estimation values of the turning characteristics (the stability factor Kh and the steering-response time constant coefficient Tp) estimated during the ended turn running. Subsequently, the operation corresponding to the determination result is performed (in S11).

The validity determining unit 12 changes the changing operation on the estimation values of the turning characteristics corresponding to the result of determining whether or not the estimation is valid. More specifically, the validity determining unit 12 determines the handling operation on the estimation internal operation values corresponding to the determination result of the validity and the degree of invalidity in the case where the estimation is not valid. The estimation internal operation values are the parameters for determining the estimation values of the turning characteristics.

Here, the estimation internal operation values are the parameters for determining the transition of the estimation values of the turning characteristics (Kh and Tp). The estimation values of Kh and Tp are determined based on the estimation internal operation values. As described above, in this embodiment, the estimation internal operation values of Kh are the integrated value I_Gy of Gyfbpf and the integrated value I_Es of Esbpf that are calculated by the above-described formulas (7) to (10). The estimation internal operation values of Tp are the integrated values I_Esn (n=1 to 5) of the yaw rate deviation corresponding to the five level values Tpn calculated by the above-described formula (19).

As the handling operation on the estimation internal operation values, specifically, the following three types of operations (i), (ii), and (iii) are set.

(i) Update the estimation internal operation values with the respective values of the estimation internal operation values that are currently held in the ECU 1 (hereinafter also described as an operation "UPDATE")

(ii) Reset the estimation internal operation values to the values (in other words, the values at the time point when determination of Yes is made in step S8 in the process at this time) during the previous turn running (hereinafter also described as an operation "RESET TO PREVIOUS VALUES")

(iii) Initialize the estimation internal operation values (hereinafter also described as an operation "RESET TO INITIAL VALUES")

The validity determining unit 12 changes the estimation internal operation values as necessary corresponding to the validity determination of the estimation values. This also changes the estimation values of the turning characteristics determined based on these operation values as necessary. That is, a similar changing operation is performed on the estimation values of the turning characteristics in conjunction with the handling operation on the estimation internal operation values.

For example, in the case where the above-described handling operation (i) is performed, regarding the estimation internal operation values, the integrated value I_Gy of Gyfbpf, the integrated value I_Es of Esbpf, and the integrated values I_Esn (n=1 to 5) of the yaw rate deviation that are calculated during the turn running at this time are stored as new estimation internal operation values. Using these values, the stability factor Kh and the steering-response time constant coefficient Tp are calculated. These calculated Kh and Tp are Kh and Tp that are calculated in step S9 in the last loop during the turn running at this time.

In the case where the above-described handling operation (ii) is performed, the values obtained by subtracting Gyfbpf, Esbpf, and Esn (n=1 to 5) calculated in each loop during the turn running at this time from I_Gy, I_Es, and I_Esn (n=1 to 5) are stored as new estimation internal operation values.

The validity determining unit 12 defines the determination of the handling operation on the estimation internal operation values using a state transition table 50 in FIG. 3. In the state transition table 50, the vertical axis denotes the current state (described as "ESTIMATED STATE" in the drawing) of the estimating process. Specifically, as the estimated state, there are two types of states of a state (a state 0) without a result of determining that there is validity in the past estimating process and a state (a state 1) with a result of determining that there is validity in the past estimating process.

The horizontal axis in the state transition table 50 denotes determination events for determining the handling operation on the estimation internal operation values and combinations of the determination results of these determination events. Specifically, as the determination events, three types of events of "TURNING HAS BEEN ENDED?", "ESTIMATION IS VALID?", and "ESTIMATION IS NOT VALID AND ESTIMATION INTERNAL OPERATION VALUES ARE INTENDED TO BE INITIALIZED?" are set. As the combinations of the respective determination results (YES or NO) of the events, four combinations are set. Here, the detail of the respective determination criteria of the determination events will be described later with reference to FIG. 4 to FIG. 6.

In respective cells 51 to 57 where the estimated states intersect with the items of the event determination results in the state transition table 50, the transition destination (described as "ESTIMATED STATE" in FIG. 3) of the estimated state and the handling operation (described as "WHAT IS ACTION ON ESTIMATION INTERNAL OPERATION VALUES?" in FIG. 3) on the estimation internal operation values are set corresponding to the estimated state and the event determination results.

A description will be given of the state transition in accordance with the state transition table 50 in FIG. 3.

Firstly, consider a case where the estimated state is the state 0 (without the positive result in validity estimation). At this time, in the case where the determination result of the determination event "TURNING HAS BEEN ENDED?" is NO, as illustrated in the cell 51 in FIG. 3, the validity determining unit 12 keeps the values up to the present of the estimation internal operation values and does not make any changes since the turn running of the vehicle 10 has not been ended. Corresponding to this operation, the validity determining unit 12 keeps the estimated state as the state 0.

In the case where the estimated state is the state 0, the determination result of the determination event "TURNING HAS BEEN ENDED?" is YES, and the determination result of "ESTIMATION IS VALID?" is NO, as illustrated in the cell 52 in FIG. 3, the validity determining unit 12 determines that the estimation values during the turn running at this time are not valid although this turn running of the vehicle 10 has been ended. Then the validity determining unit 12 resets the estimation internal operation values to the initial values. Corresponding to this operation, the validity determining unit 12 keeps the estimated state as the state 0.

In the case where the estimated state is the state 0, the determination result of the determination event "TURNING HAS BEEN ENDED?" is YES, and the determination result of "ESTIMATION IS VALID?" is YES, as illustrated in the cell 53 in FIG. 3, the validity determining unit 12 determines that the turn running of the vehicle 10 has been ended and the estimation values during the turn running at this time are valid. Then the validity determining unit 12 updates the estimation internal operation values. Corresponding to this operation, the validity determining unit 12 changes the estimated state to the state 1 (with the positive result in validity estimation).

In the case where the estimated state is the state 1 (with the positive result in validity estimation) and the determination result of the determination event "TURNING HAS BEEN ENDED?" is NO, as illustrated in the cell 54 in FIG. 3, the validity determining unit 12 keeps the values up to the present of the estimation internal operation values and does not make any changes since the turn running of the vehicle 10 has not been ended. Corresponding to this operation, the validity determining unit 12 keeps the estimated state as the state 1.

In the case where the estimated state is the state 1, the determination result of the determination event "TURNING HAS BEEN ENDED?" is YES, the determination result of "ESTIMATION IS VALID?" is NO, and the determination result of "ESTIMATION IS NOT VALID AND ESTIMATION INTERNAL OPERATION VALUES ARE INTENDED TO BE INITIALIZED?" is YES, as illustrated in the cell 55 in FIG. 3, the validity determining unit 12 determines that the estimation values during the turn running at this time are not valid although this turn running of the vehicle 10 has been ended and that the estimation internal operation value are to be initialized. Then the validity determining unit 12 resets the estimation internal operation values to the initial values. Corresponding to this operation, the validity determining unit 12 changes the estimated state to the state 0.

In the case where the estimated state is the state 1, the determination result of the determination event "TURNING HAS BEEN ENDED?" is YES, the determination result of "ESTIMATION IS VALID?" is NO, and the determination result of "ESTIMATION IS NOT VALID AND ESTIMATION INTERNAL OPERATION VALUES ARE INTENDED TO BE INITIALIZED?" is NO, as illustrated in the cell 56 in FIG. 3, the validity determining unit 12 determines that the estimation values during the turn running at this time are not valid although the turn running of the vehicle 10 has been ended while the estimation internal operation values need not be initialized. Then the validity determining unit 12 resets the estimation internal operation values to the previous values. Corresponding to this operation, the validity determining unit 12 keeps the estimated state as the state 1.

In the case where the estimated state is the state 1, the determination result of the determination event "TURNING HAS BEEN ENDED?" is YES, and the determination result of "ESTIMATION IS VALID?" is YES, as illustrated in the cell 57 in FIG. 3, the validity determining unit 12 determines that the turn running of the vehicle 10 has been ended and the estimation values during the turn running at this time are valid. Then the validity determining unit 12 updates the estimation internal operation values. Corresponding to this operation, the validity determining unit 12 keeps the estimated state as the state 1.

Here, a description will be given of the detail of the determination criteria of the determination event "ESTIMATION IS VALID?" set to the state transition table 50 with reference to FIG. 4 and FIG. 5.

When the process in this step is performed, the process for estimating the turning characteristics (Kh and Tp) in step S9 is repeatedly performed during the turn running at this time that is determined to have ended in step S8 in the process loop at this time. Accordingly, assuming that the estimation values of the turning characteristics calculated in one process in step S9 and various parameter values used for computing these estimation values are set as one data set, a plurality of data sets corresponding to the number of processes of step S9 performed during the turn running at this time is held in the ECU 1.

In the case where each of these data sets satisfies all the following conditions (1) to (4), the validity determining unit 12 determines that the estimation of the turning characteristics performed during the turn running at this time is valid.

(1) The absolute value of the deviation (the yaw rate deviation) between the standard yaw rate YrStd and the actual yaw rate Yr is equal to or less than a predetermined value a (2) The correlation coefficient between the standard yaw rate YrStd and the actual yaw rate Yr is equal to or more than a predetermined threshold value b (3) The absolute value of the deviation between the value YrStdHpf obtained by the high-pass filter (HPF) process on the standard yaw rate YrStd and the value YrHpf obtained by the HPF process on the actual yaw rate Yr is equal to or less than a predetermined value c (4) The ratio between the integrated absolute value of YrStdHpf and the integrated absolute value of YrHpf is around 1.

Here, the "standard yaw rate YrStd" to be used in the above-described conditions is a value calculated by substituting the estimation values Kh and Tp of the turning characteristics, the vehicle speed V, the lateral acceleration Gy, and the steering angle δ that are used in these estimation values, and similar parameter into the above-described formula (1). The HPF process for deriving YrStdHpf and YrHpf can employ, for example, a first order HPF with a cutoff frequency of 0.2 [Hz] so as to remove sensor zero errors from data.

Regarding the condition (1), as illustrated in FIG. 4, consider a case where a coordinate plane in which the horizontal axis denotes the actual yaw rate Yr and the vertical axis denotes the standard yaw rate YrStd is set and a data point group corresponding to the respective data sets acquired during the turn running at this time is plotted on this coordinate plane.

In the coordinate plane of FIG. 4, when all of the data point group is plotted within a region A1 where |Yr−YrStd|<a, that is, all the data exists within the region A1, the above-described condition (1) is satisfied. In other words, the region A1 is a region that is sandwiched between a line L1: YrStd=Yr+a and a line L2: YrStd=Yr−a and that includes the origin. If the estimation has perfect accuracy, the data point group might be plotted on a line L0: YrStd=Yr that passes through the origin and has a gradient of 1. In the case where the condition (1) is satisfied, all of the data point group converges to the range having an allowable error of the predetermined value a in the positive and negative directions of YrStd from this line L0.

Here, the predetermined value a can be set to, for example, 8 [deg/s]. In the front-wheel steering-angle equivalent value (Yr−YrStd) L/V, the predetermined value a can be set to, for example, 20 [deg].

With this condition (1), the determination threshold value is set to the value containing the sensor zero error. This allows determining whether the estimation value is valid in the data containing the sensor zero error in the low-frequency region.

Regarding the condition (2), similarly to the condition (1), consider the coordinate plane in which the horizontal axis denotes the actual yaw rate Yr and the vertical axis denotes the standard yaw rate YrStd. On the coordinate plane of FIG. 4, when all of the data point group is plotted in an approximately linear shape at the proximity of the line L0, the above-described condition (2) is satisfied. Here, the threshold value b is a value equal to or less than 1 and can be set to, for example, 0.9.

This condition (2) allows determining the degree of the linear shape by the data point group of the estimation values. Even when the data is within the region A1 with the condition (1), in the case where the data point group is distributed in an ellipsoidal shape on the coordinate plane of FIG. 4 due to, for example, poor estimation accuracy of Tp, that is, in the case where hysteresis characteristics are provided, the validity determining unit 12 can determine that the estimation is not valid based on the condition (2). Since the correlation coefficient is not affected by the sensor zero error, the determination accuracy of the validity can be improved.

Regarding the condition (3), as illustrated in FIG. 5, consider a case where a coordinate plane in which the horizontal axis denotes the value YrHpf obtained by the HPF process on the actual yaw rate Yr and the vertical axis denotes the value YrStdHpf obtained by the HPF process on the standard yaw rate YrStd is set and a data point group corresponding to the respective data sets acquired during the turn running at this time is plotted on this coordinate plane.

In the coordinate plane of FIG. 5, when all of the data point group is plotted within a region A2 where |YrHpf−YrStdHpf|<c, that is, all the data exists within the region A2, the above-described condition (3) is satisfied. In other words, the region A2 is a region that is sandwiched between a line L3: YrStdHpf=YrHpf+c and a line L4: YrStdHpf=YrHpf−c and that includes the origin.

The HPF process removes the sensor zero errors from the elements on this coordinate plane as described above. Accordingly, the predetermined value c can be smaller than the predetermined value a in the condition (1), that is, can be set in a severe condition. For example, the predetermined value c can be set to 3 [deg/s]. In the front-wheel steering-angle equivalent value (YrHpf−YrStdHpf)L/V, the predetermined value c can be set to, for example, 10 [deg].

This condition (3) allows determining that the estimation value is valid in the data without containing the sensor zero error in the high-frequency region.

Regarding the condition (4), the validity is determined based on the integrated absolute value of YrStdHpf and the integrated absolute value of YrHpf. The state where the condition (4) is satisfied is a state where the ratios between the integrated absolute value of YrStdHpf and the integrated absolute value of YrHpf corresponding to the respective data sets acquired during the turn running at this time are around 1 (for example, 0.9 to 1.1).

Since the data in the high-frequency region is used in the condition (3), it is often determined that the estimation is not valid due to road surface disturbance or similar reason with the condition (3) alone. Adding this condition (4) allows linearity determination with high noise resistance. This consequently allows extending the threshold value in the condition (3) (setting the predetermined value c to be large), thus leading to an increase in estimation frequency.

Next, a description will be given of the detail of the determination criteria of the determination event "ESTIMATION IS NOT VALID AND ESTIMATION INTERNAL OPERATION VALUES ARE INTENDED TO BE INITIALIZED?" set to the state transition table 50 with reference to FIG. 6.

In the case where data sets acquired during the turn running at this time are each formed by the estimation values of the turning characteristics calculated in the process for estimating the turning characteristics (Kh and Tp) in step S9 and various parameter values used for computing these estimation values and all the combinations of the data sets satisfy the following conditions (5) and (6), the validity determining unit 12 determines that the estimation of the turning characteristics performed during the turn running at this time is not valid and the estimation internal operation values are to be initialized.

(5) There is data in which the absolute value of the deviation between YrStdHpf and YrHpf is equal to or more than a predetermined value d (6) The ratio between the integrated absolute value of YrStdHpf and the integrated absolute value of YrHpf is not around 1

Regarding the condition (5), similarly to the above-described conditions (3) and (4), as illustrated in FIG. 6, consider a case where a coordinate plane in which the horizontal axis denotes the value YrHpf obtained by the HPF process on the actual yaw rate Yr and the vertical axis denotes the value YrStdHpf obtained by the HPF process on the standard yaw rate YrStd is set and a data point group corresponding to the respective data sets acquired during the turn running at this time is plotted on this coordinate plane.

In the coordinate plane of FIG. 6, when at least a part of the data point group is plotted in the position outside of the region A3 where |YrHpf−YrStdHpf|<d, that is, there is data outside of the region A3, the above-described condition (5) is satisfied. In other words, the region A3 is a region that is sandwiched between a line L5: YrStdHpf=YrHpf+d and a line L6: YrStdHpf=YrHpf−d and that includes the origin. That is, in the state where the condition (5) is satisfied, at least a part of the data point group is plotted in a region in the positive direction (the upward direction in FIG. 6) on the YrStdHpf axis with respect to the line L5 or in a region in the negative direction (the downward direction in FIG. 6) on the YrStdHpf axis with respect to the line L6.

The predetermined value d can be set to be larger than the predetermined value c in the condition (3). The predetermined value d can be set to, for example, 4 [deg/s]. In the front-wheel steering-angle equivalent value (YrHpf−YrStdHpf)L/V, the predetermined value d can be set to, for example, 15 [deg].

By setting the predetermined value d to be larger than the predetermined value c, for example, in the case where the condition (3) is not satisfied and thus the estimation is determined to be not valid and the data point group exists within the range of the predetermined value d, it is determined that the estimation values outside of the condition (3) have occurred in minute amounts and thus the validity determining unit 12 does not reset the estimation values to the initial values (resets these values to the previous values) in this configuration.

The state where the condition (6) is satisfied is a state where the ratio between the integrated absolute value of YrStdHpf and the integrated absolute value of YrHpf corresponding to the respective data sets acquired during the turn running at this time is not around 1 (for example, equal to or less than 0.8 or equal to or more than 1.1).

In the case where the loading condition is changed (for example, due to collapsing load), if the estimation internal operation values are not initialized and the estimation is continued as it is, the estimation internal operation values again converge to values after the change in loading condition. In contrast, the configuration that initializes the estimation internal operation values in the case where the loading condition is changed by a predetermined amount or more based on the conditions (5) and (6) allows the estimation values to converge to the appropriate values after the change in loading condition earlier, thus achieving an appropriate vehicle stabilization control earlier.

Here, the conditions (5) and (6) are in a trade-off relationship as follows.

In case of long turning, the condition (5) is likely to be satisfied due to road surface disturbance or similar reason. On the other hand, since the integrated value becomes large, the ratio is likely to approach 1. Thus, the condition (6) is less likely to be satisfied.

In case of short turning, the loading condition is less likely to change. Thus, (5) is less likely to be satisfied. On the other hand, since the integrated value becomes small, the ratio is likely to be different from 1. Thus, (6) is likely to be satisfied.

The process for initializing the estimation internal operation values is expected to provide an effect that allows the estimation values to converge to the appropriate values after the change in loading condition faster as described above. On the other hand, all the estimation results of the turning characteristics accumulated up to the present are eliminated. Thus, it becomes temporarily difficult to perform an appropriate vehicle stabilization control. Accordingly, it is preferred to avoid an unnecessary initialization process due to erroneous determination or similar reason. Thus, in this embodiment, as the conditions for the initialization process, the two conditions (5) and (6) in a trade-off relationship as described above are confirmed together so as to reduce the risk of the erroneous determination.

The following describes effects of the turning characteristic estimating device according to this embodiment.

The stability factor Kh and the steering-response time constant coefficient Tp that are the parameter values related to the turning characteristics of the vehicle 10 are used for controlling the movement of the vehicle 10 such that the ECU 1 stabilizes the turning behavior of the vehicle 10 as described above.

Particularly, in a vehicle such as a freight vehicle with a large capacity, as a possible situation, the vehicle weight, the vehicle yaw inertia moment, the barycentric position in the front-rear direction of the vehicle, the equivalent cornering power (CP) of the tire, and similar parameter are changed corresponding to the number of occupants and the loading condition. As a result, the stability factor Kh and the steering-response time constant coefficient Tp are changed during the vehicle running. Specific situations where various conditions of the vehicle 10 are changed includes, for example, the case where the positions of the occupant and the cargo are moved during the vehicle running, the case where the cargo weight is changed during the vehicle running (the luggage is dropped off or the luggage is loaded), and the case where the equivalent CP is non-linear with respect to the equivalent slip angle during low μ running.

The stability factor Kh and the steering-response time constant coefficient Tp are parameters to be used when the standard yaw rate YrStd that is the target value of the stabilizing control on the vehicle 10 is calculated. Accordingly, when these parameters are deviated from the true value, it becomes difficult to perform an appropriate turning control on the vehicle 10. Thus, even in the case where various conditions of the vehicle 10 are changed during the vehicle running, it is preferred to accurately estimate the turning characteristics (the stability factor Kh and the steering-response time constant coefficient Tp) of the vehicle 10.

Now, the validity determining unit 12 in the ECU 1 that functions as the turning characteristic estimating device of this embodiment determines the validity of the estimation values based on the standard yaw rate YrStd of the vehicle 10 and the actual yaw rate Yr of the vehicle 10 that are calculated using the estimation values of the stability factor Kh and the steering-response time constant coefficient Tp estimated by the turning-characteristic estimating unit 11.

With this configuration, the validity determining unit 12 determines the validity of the estimation values of the stability factor Kh and the steering-response time constant coefficient Tp estimated by the turning-characteristic estimating unit 11. Accordingly, by taking into consideration the determination result of this validity, it is possible to sort out the estimation values, detect the changes of the various conditions during the vehicle running, and know the importance of the estimation values. This allows efficiently estimating the stability factor Kh and the steering-response time constant coefficient Tp, thus improving the estimation accuracy of the turning characteristics Kh and Tp.

The validity determining unit 12 in this embodiment changes the changing operation on the stability factor Kh and the steering-response time constant coefficient Tp of the vehicle 10 corresponding to the determination result of the validity for the estimation values of the turning characteristics Kh and Tp.

This configuration allows setting the changing operation on the stability factor Kh and the steering-response time constant coefficient Tp as necessary corresponding to the determination result of the validity. For example, in the case where the validity is high, the degree of the change of the turning characteristics Kh and Tp is set to be large. On the other hand, in the case where the validity is low, the degree of the change is set to be small. Accordingly, this configuration allows more efficiently estimating the stability factor Kh and the steering-response time constant coefficient Tp. This allows further improving the estimation accuracy of the turning characteristics Kh and Tp and quickly acquiring the proper values of the turning characteristics Kh and Tp. As a result, for example, the vehicle motion control such as ABS, TRC, and VSC can be performed more appropriately so as to further ensure the vehicle running stability.

In the conventional estimation method for the stability factor Kh and the steering-response time constant coefficient Tp, it is necessary to restrict the enabling conditions of the estimating process to ensure the estimation accuracy. For example, the enabling conditions are limited to a grip running state. In contrast, this embodiment allows adjusting the changing method for the stability factor Kh and the steering-response time constant coefficient Tp corresponding to the determination result of the validity for the estimation values of the turning characteristics Kh and Tp. This allows eliminating the need for high estimation accuracy for all the estimation values of the turning characteristics Kh and Tp, thus easing the enabling conditions of the estimating process of the turning characteristics Kh and Tp. Accordingly, it is possible to increase the frequency of performance of the estimating process of the turning characteristics Kh and Tp, thus shortening the time of estimation. That is, the configuration in this embodiment ensures the compatibility between securement of the estimation accuracy of the turning characteristics Kh and Tp and time shortening. Specifically, the turning characteristic estimating device in this embodiment allows ensuring the Kh estimation accuracy of around $\pm 50 \times 10^{-5}$ in the estimating process, for example, during one turn running of the vehicle 10 at a lateral acceleration of about 0.2 [G].

The validity determining unit 12 in this embodiment determines that the estimation values of the turning characteristics Kh and Tp are valid in the case where the absolute value of the deviation between the standard yaw rate YrStd and the actual yaw rate Yr is equal to or less than the predetermined value a (in the case where the condition (1) is satisfied). This configuration determines that the estimation values of the turning characteristics Kh and Tp with a small deviation between the standard yaw rate YrStd and the actual yaw rate Yr are valid, thus improving the determination accuracy of the validity for the estimation values of the turning characteristics Kh and Tp.

The validity determining unit 12 in this embodiment determines that the estimation values of the turning characteristics Kh and Tp are valid in the case where the correlation coefficient between the standard yaw rate YrStd and the actual yaw rate Yr is equal to or more than the predetermined threshold value b (in the case where the condition (2) is satisfied). This configuration determines that the estimation values of the turning characteristics Kh and Tp with a high correlation between the standard yaw rate YrStd and the actual yaw rate Yr are valid, thus improving the determination accuracy of the validity for the estimation values of the turning characteristics Kh and Tp.

The validity determining unit 12 in this embodiment determines that the estimation values of the turning characteristics Kh and Tp are valid in the case where the absolute value of the deviation between the value YrStdHpf obtained by the high-pass filter process on the standard yaw rate YrStd and the value YrHpf obtained by the high-pass filter process on the actual yaw rate Yr is equal to or less than the predetermined value c (in the case where the condition (3) is satisfied). This configuration determines that the estimation values of the turning characteristics Kh and Tp with a small deviation between YrStdHpf and YrHpf without being affected by the sensor zero errors by the HPF process are valid, thus further improving the determination accuracy of the validity for the estimation values of the turning characteristics Kh and Tp.

The validity determining unit 12 in this embodiment determines that the estimation values of the turning characteristics Kh and Tp are valid in the case where the ratio between the integrated absolute value of the value YrStdHpf obtained by the high-pass filter process on the standard yaw rate YrStd and the integrated absolute value of the value YrHpf obtained by the high-pass filter process on the actual yaw rate Yr is within a predetermined range (around 1) (in the case where the condition (4) is satisfied). This configuration determines that the estimation values of the turning characteristics Kh and Tp are valid at a ratio of around 1 between the integrated absolute value of YrStdHpf and the integrated absolute value of YrHpf, thus further improving the determination accuracy of the validity for the estimation values of the turning characteristics Kh and Tp.

The validity determining unit 12 in this embodiment updates the stability factor Kh and the steering-response time constant coefficient Tp of the vehicle 10 in accordance with the estimation values of the turning characteristics Kh and Tp in the case where the estimation values of the turning characteristics Kh and Tp are determined to be valid. In the case where the estimation values of the turning characteristics Kh and Tp are determined to be not valid, the validity determining unit 12 resets the stability factor Kh and the steering-response time constant coefficient Tp of the vehicle 10 to the states before the turning-characteristic estimating unit 11 has just estimated the estimation values used for the determination of the validity at this time (resets these values to the previous values).

This configuration allows setting the changing method for the stability factor Kh and the steering-response time constant coefficient Tp as necessary so as to update these parameters with the estimation values of the turning characteristics Kh and Tp or reset these parameters to the previous values, corresponding to the determination result of the validity, thus further improving the estimation accuracy of the stability factor Kh and the steering-response time constant coefficient Tp.

The validity determining unit 12 in this embodiment resets the stability factor Kh and the steering-response time constant coefficient Tp of the vehicle 10 to the initial values in the case where the absolute value of the deviation between the value YrStdHpf obtained by the high-pass filter process on the standard yaw rate YrStd and the value YrHpf obtained by the high-pass filter process on the actual yaw rate Yr is equal to or more than the predetermined value d (in the case where the condition (5) is satisfied).

This configuration allows quickly detecting the change in loading condition of the vehicle 10 in the case where the above-described condition (5) is satisfied. Correspondingly, performing the process for resetting the stability factor Kh and the steering-response time constant coefficient Tp to the initial values allows these parameters to converge to the proper values after the change in loading condition faster, thus achieving an appropriate vehicle stabilization control faster.

The validity determining unit 12 in this embodiment resets the stability factor Kh and the steering-response time constant coefficient Tp of the vehicle 10 to the initial values in the case where the ratio between the integrated absolute value of the value YrStdHpf obtained by the high-pass filter process on the standard yaw rate YrStd and the integrated absolute value of the value YrHpf obtained by the high-pass filter process on the actual yaw rate Yr is outside of the predetermined range (in the case where the condition (6) is satisfied).

This configuration allows quickly detecting the change in loading condition of the vehicle 10 in the case where the above-described condition (6) is satisfied. Correspondingly, performing the process for resetting the stability factor Kh and the steering-response time constant coefficient Tp to the initial values allows these parameters to converge to the proper values after the change in loading condition faster, thus achieving an appropriate vehicle stabilization control faster.

[Second Embodiment]

Figure 7:
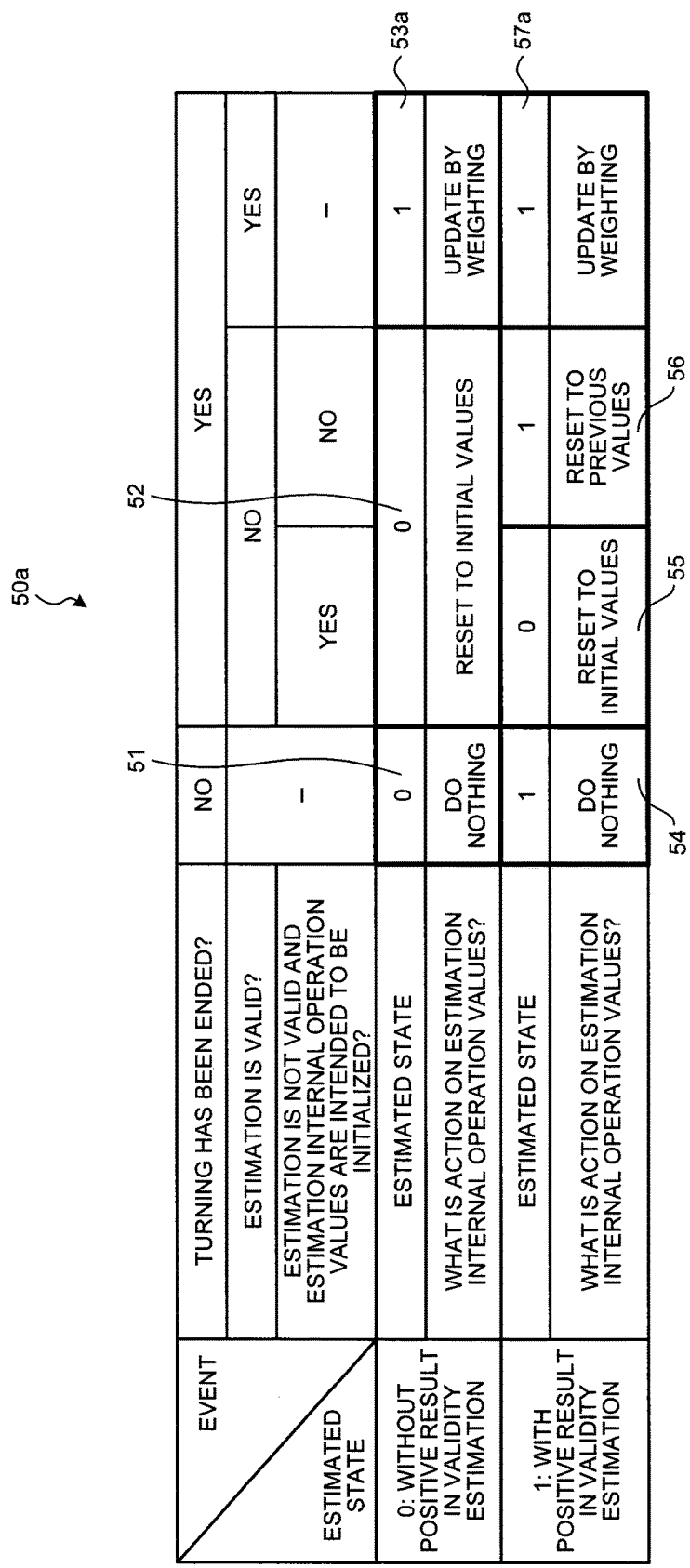
FIG. 7 is a diagram illustrating one example of a state transition table to be used in the process of step S11 in the flowchart of FIG. 2 according to a second embodiment of the present invention.

The following describes a second embodiment of the present invention with reference to FIG. 7. FIG. 7 is a diagram illustrating one example of a state transition table to be used in the process of step S11 in the flowchart of FIG. 2 according to the second embodiment.

This embodiment is different from the first embodiment in that the validity determining unit 12 performs weighting to update the estimation internal operation values after the estimation is determined to be valid.

Specifically, in the process of step S11 in the flowchart of FIG. 2, a state transition table 50a illustrated in FIG. 7 is used instead of the state transition table 50 in FIG. 3. The state transition table 50a of FIG. 7 is different from the state transition table 50 of FIG. 3 in content for the handling operation on the estimation internal operation values set to cells 53a and 57a. Here, only this difference will be described.

In the case where the estimated state is the state 0, the determination result of the determination event "TURNING HAS BEEN ENDED?" is YES, and the determination result of "ESTIMATION IS VALID?" is YES, as illustrated in the cell 53a of FIG. 7, the validity determining unit 12 determines that the turn running of the vehicle 10 has been ended and the estimation values during the turn running at this time are valid. Then the validity determining unit 12 performs weighting to update the estimation internal operation values (described as "UPDATE BY WEIGHTING" in FIG. 7). Corresponding to this operation, the validity determining unit 12 changes the estimated state to the state 1 (with the positive result in validity estimation).

In the case where the estimated state is the state 1, the determination result of the determination event "TURNING HAS BEEN ENDED?" is YES, and the determination result of "ESTIMATION IS VALID?" is YES, as illustrated in the cell 57a of FIG. 7, the validity determining unit 12 determines that the turn running of the vehicle 10 has been ended and the estimation values during the turn running at this time are valid. Then the validity determining unit 12 performs weighting to update the estimation internal operation values. Corresponding to this operation, the validity determining unit 12 keeps the estimated state as the state 1.

Here, a description will be given of the handling operation on the estimation internal operation values by "WEIGHTING TO UPDATE ESTIMATION INTERNAL OPERATION VALUES" performed in this embodiment. In this operation, different weights are set to the data sets used for determining the validity corresponding to the degree of the estimated validity. For example, the weight is set to be large as the validity becomes better. The quality of the validity depends on the existence range of the data sets with respect to the determination threshold values of the conditions (1) to (4) for determining the above-described validity. For example, when the data set is twice as accurate as the determination threshold value, the weight can be set to be twice. When the data set is three times as accurate as the determination threshold value, the weight can be set to be three times.

Specifically, for example, for the above-described condition (2) "The correlation coefficient between the standard yaw rate YrStd and the actual yaw rate Yr is equal to or more than the predetermined threshold value b", when the threshold value b is set to 0.9 and the correlation coefficient with the data sets used for determining the validity becomes, for example, 0.95 that is a value far better than the threshold value, the data sets are considered to be accurate with respect to the determination threshold value. Accordingly, the weight larger than usual is set to these data sets. For the above-described condition (3) "The absolute value of the deviation between YrStdHpf and YrHpf is equal to or less than the predetermined value c", when the predetermined value c is set to 3 [deg/s] and the absolute value of the deviation between YrStdHpf and YrHpf regarding the data sets used for determining the validity becomes, for example, equal to or less than 1.5 [deg/s] that is a value far better than the predetermined value c, the data sets that satisfy this condition are considered to be accurate with respect to the determination threshold value. Accordingly, the weight larger than usual is set to these data sets.

Then, the estimation internal operation values are updated while the weight set for each data set is reflected. For the stability factor Kh, Gyfbpf and Esbpf that are the elements of the estimation internal operation value of Kh are multiplied by the weight set for each data set so as to integrate this value with the previous value of the estimation internal operation value. Thus, the estimation internal operation value of Kh is updated. As a result, Kh is also updated. For the steering-response time constant coefficient Tp, Esn (n=1 to 5) that are the elements of the estimation internal operation value of Tp are multiplied by the weight set for each data set so as to integrate this value with the previous value of the estimation internal operation value. Thus, the estimation internal operation value of Tp is updated. As a result, Tp is also updated.

Thus, in this embodiment, in the case where the estimation values of the turning characteristics Kh and Tp are determined to be valid, weight is set to the estimation value corresponding to the degree of the validity of the estimation value to reflect the weighting, so as to update the stability factor Kh and the steering-response time constant coefficient Tp of the vehicle 10.

This configuration allows preferentially reflecting the data with high validity of estimation to the estimation internal operation values while relatively reducing the influence of the data with low validity of estimation on the estimation internal operation values. This allows the estimation values of the stability factor Kh and the steering-response time constant coefficient Tp to quickly and accurately converge to the proper values, thus achieving an appropriate vehicle stabilization control faster.

[Third Embodiment]

Figure 8:
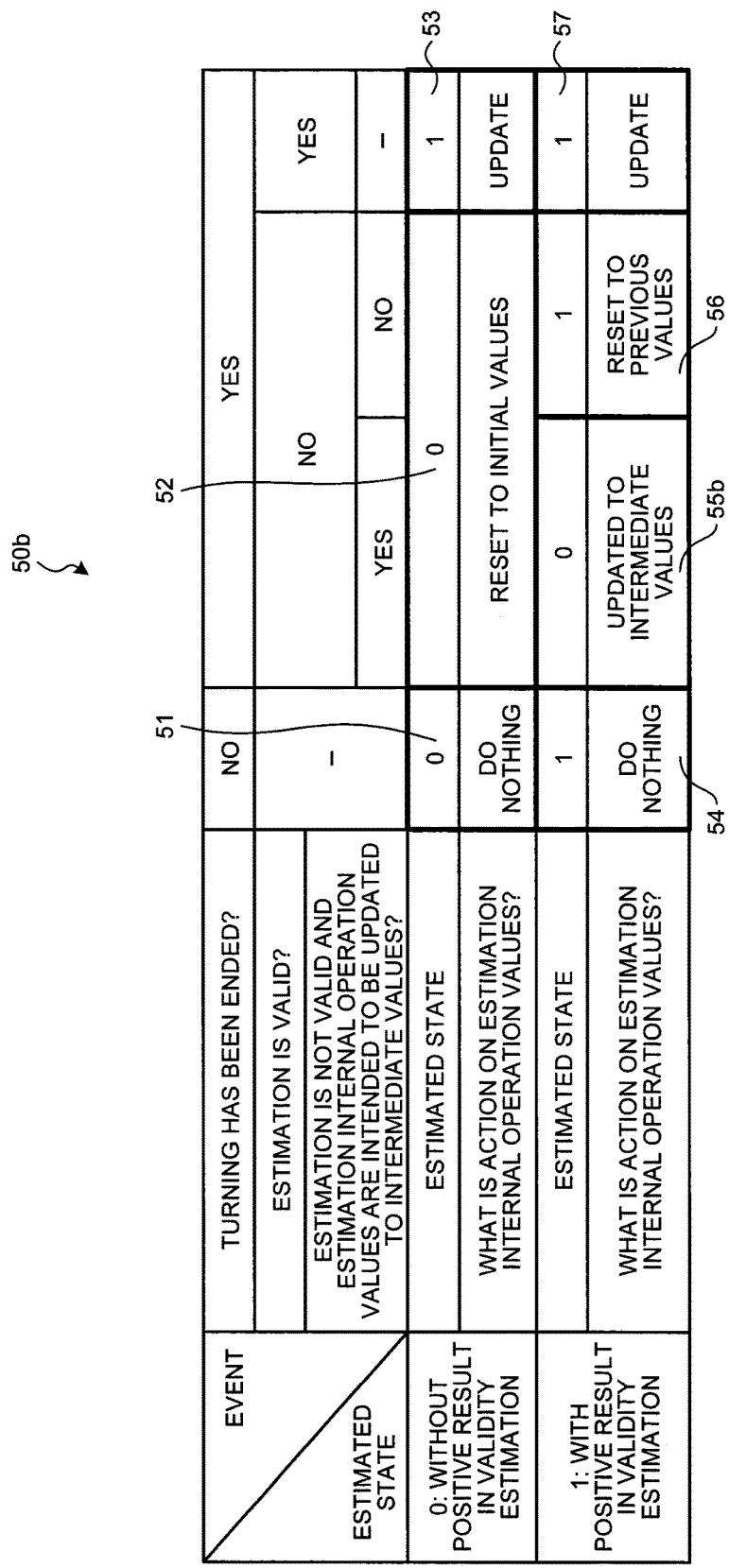
FIG. 8 is a diagram illustrating one example of a state transition table to be used in the process of step S11 in the flowchart of FIG. 2 according to a third embodiment of the present invention.

The following describes a third embodiment of the present invention with reference to FIG. 8. FIG. 8 is a diagram illustrating one example of a state transition table to be used in the process of step S11 in the flowchart of FIG. 2 according to the third embodiment.

In this embodiment, in the process of step S11 in the flowchart of FIG. 2, a state transition table 50b illustrated in FIG. 8 is used instead of the state transition table 50 in FIG. 3. The state transition table 50b of FIG. 8 is different from the state transition table 50 of FIG. 3 in content for the handling operation on the estimation internal operation values set to the cell 55b. Here, only this difference will be described.

In the case where the estimated state is the state 1, the determination result of the determination event "TURNING HAS BEEN ENDED?" is YES, the determination result of "ESTIMATION IS VALID?" is NO, and the determination result of "ESTIMATION IS NOT VALID AND ESTIMATION INTERNAL OPERATION VALUES ARE INTENDED TO BE UPDATED TO INTERMEDIATE VALUES?" is YES, as illustrated in the cell 55b of FIG. 8, the validity determining unit 12 determines that the estimation values during the turn running at this time are not valid although the turn running of the vehicle 10 has been ended and that the estimation internal operation values are to be changed. Then the validity determining unit 12 updates the estimation internal operation values to the intermediate values between these values and the initial values. Corresponding to this operation, the validity determining unit 12 changes the estimated state to the state 0.

Here, the "intermediate value" used in this embodiment is a value between the latest estimation internal operation value stored in the ECU 1 at the present time and the initial value. For the stability factor Kh, the estimation internal operation value includes the integrated value I_Gy of the lateral acceleration Gyfbpf and the integrated value I_Es of the actual yaw rate Esbpf. Accordingly, the values obtained by reducing these integrated values I_Gy and I_Es to half, one-third, or similar amount are calculated as the intermediate values. For the steering-response time constant coefficient Tp, the estimation internal operation value includes the integrated values I_Esn (n=1 to 5) of the yaw rate deviation. Accordingly, the values obtained by reducing these integrated values I_Esn to half, one-third, or similar amount are calculated as the intermediate values.

As described also in the first embodiment, in the process for initializing the estimation internal operation values, all the estimation results of the turning characteristics accumulated up to the present are eliminated. Thus, it becomes temporarily difficult to perform an appropriate vehicle stabilization control. In this embodiment, in the case where the estimation internal operation values are to be changed due to the change in loading condition or similar reason, the estimation internal operation values are not reset to the initial values but updated to the intermediate values. This allows improving the robustness of the vehicle stabilization control while gradually reducing the past influence. In the case where the turning condition is changed, turning is continued and the process for updating the intermediate values is repeated. Accordingly, the estimation internal operation values are decreased by 2 to the power of n (n is the number of turnings). This allows promptly estimating the appropriate values after the change in loading condition.

The preferred embodiments of the present invention have been described above. The present invention is not limited to these embodiments. The present invention may be constituted by a combination of a plurality of the above-described embodiments. Also, the respective components of the embodiments described above encompass components that can be easily replaced by a person skilled in the art or components that are substantially same.

For example, while in the above-described embodiments three types of events of "TURNING HAS BEEN ENDED?", "ESTIMATION IS VALID?", "ESTIMATION IS NOT VALID AND ESTIMATION INTERNAL OPERATION VALUES ARE INTENDED TO BE INITIALIZED?" are set as the determination events for the state transition tables 50, 50a, and 50b, at least a part of these determination events may be set.

While in the above-described embodiments the above-described conditions (1) to (4) have been described as the determination criteria for the determination event "ESTIMATION IS VALID?" set to the state transition tables 50, 50a, and 50b, at least a part of the conditions (1) to (4) may be set as the determination criteria. Similarly, while the above-described conditions (5) and (6) have been described as the determination criteria for the determination event "ESTIMATION IS NOT VALID AND ESTIMATION INTERNAL OPERATION VALUES ARE INTENDED TO BE INITIALIZED?" set to the state transition tables 50, 50a, and 50b, only one of these may be set as the determination criteria.

In the above-described embodiments, the validity determining unit 12 selects the changing operation (the handling operation on the estimation internal operation values) on the estimation values of the turning characteristics Kh and Tp from "UPDATE ("UPDATE BY WEIGHTING" in the second embodiment)", "RESET TO PREVIOUS VALUES", and "RESET TO INITIAL VALUES ("UPDATE TO INTERMEDIATE VALUES" in the third embodiment)" corresponding to the determination result of the validity of the estimation values or similar parameter as the configuration. However, the selectable contents for the changing operation may be changed as necessary.

REFERENCE SIGNS LIST

1 ECU (TURNING CHARACTERISTIC ESTIMATING DEVICE)

10 VEHICLE
11 TURNING-CHARACTERISTIC ESTIMATING UNIT
12 VALIDITY DETERMINING UNIT
Kh STABILITY FACTOR
Tp STEERING-RESPONSE TIME CONSTANT COEFFICIENT
YrStd STANDARD YAW RATE
Yr ACTUAL YAW RATE

The invention claimed is:

1. A turning characteristic estimating device for a vehicle for estimating a stability factor and a time constant coefficient of steering response that are parameter values related to turning characteristics of the vehicle, wherein
the turning characteristic estimating device determines validity of estimation values based on a standard yaw rate of the vehicle and an actual yaw rate of the vehicle, the standard yaw rate being calculated by using estimation values of the stability factor and the time constant coefficient of steering response estimated by the turning characteristic estimating device.

2. The turning characteristic estimating device for the vehicle according to claim 1, wherein
the turning characteristic estimating device changes a changing operation on the stability factor and the time constant coefficient of steering response of the vehicle corresponding to a determination result of the validity of the estimation values.

3. The turning characteristic estimating device for the vehicle according to claim 1, wherein
at the time an absolute value of a deviation between the standard yaw rate and the actual yaw rate is equal to or less than a predetermined value, the turning characteristic estimating device determines that the estimation values are valid.

4. The turning characteristic estimating device for the vehicle according to claim 2, wherein
at the time an absolute value of a deviation between the standard yaw rate and the actual yaw rate is equal to or less than a predetermined value, the turning characteristic estimating device determines that the estimation values are valid.

5. The turning characteristic estimating device for the vehicle according to claim 1, wherein
at the time a correlation coefficient between the standard yaw rate and the actual yaw rate is equal to or more than a predetermined threshold value, the turning characteristic estimating device determines that the estimation values are valid.

6. The turning characteristic estimating device for the vehicle according to claim 2, wherein
at the time a correlation coefficient between the standard yaw rate and the actual yaw rate is equal to or more than a predetermined threshold value, the turning characteristic estimating device determines that the estimation values are valid.

7. The turning characteristic estimating device for the vehicle according to claim 3, wherein
at the time a correlation coefficient between the standard yaw rate and the actual yaw rate is equal to or more than a predetermined threshold value, the turning characteristic estimating device determines that the estimation values are valid.

8. The turning characteristic estimating device for the vehicle according to claim 1, wherein
at the time an absolute value of a deviation between a value obtained by a high-pass filter process on the standard yaw rate and a value obtained by a high-pass filter process on the actual yaw rate is equal to or less than a predetermined value, the turning characteristic estimating device determines that the estimation values are valid.

9. The turning characteristic estimating device for the vehicle according to claim 2, wherein
at the time an absolute value of a deviation between a value obtained by a high-pass filter process on the standard yaw rate and a value obtained by a high-pass filter process on the actual yaw rate is equal to or less than a predetermined value, the turning characteristic estimating device determines that the estimation values are valid.

10. The turning characteristic estimating device for the vehicle according to claim 3, wherein
at the time an absolute value of a deviation between a value obtained by a high-pass filter process on the standard yaw rate and a value obtained by a high-pass filter process on the actual yaw rate is equal to or less than a predetermined value, the turning characteristic estimating device determines that the estimation values are valid.

11. The turning characteristic estimating device for the vehicle according to claim 5, wherein
at the time an absolute value of a deviation between a value obtained by a high-pass filter process on the standard yaw rate and a value obtained by a high-pass filter process on the actual yaw rate is equal to or less than a predetermined value, the turning characteristic estimating device determines that the estimation values are valid.

12. The turning characteristic estimating device for the vehicle according to claim 1, wherein
at the time a ratio between an integrated absolute value of a value obtained by a high-pass filter process on the standard yaw rate and an integrated absolute value of a value obtained by a high-pass filter process on the actual yaw rate is within a predetermined range, the turning characteristic estimating device determines that the estimation values are valid.

13. The turning characteristic estimating device for the vehicle according to claim 2, wherein
at the time a ratio between an integrated absolute value of a value obtained by a high-pass filter process on the standard yaw rate and an integrated absolute value of a value obtained by a high-pass filter process on the actual yaw rate is within a predetermined range, the turning characteristic estimating device determines that the estimation values are valid.

14. The turning characteristic estimating device for the vehicle according to claim 3, wherein
at the time a ratio between an integrated absolute value of a value obtained by a high-pass filter process on the standard yaw rate and an integrated absolute value of a value obtained by a high-pass filter process on the actual yaw rate is within a predetermined range, the turning characteristic estimating device determines that the estimation values are valid.

15. The turning characteristic estimating device for the vehicle according to claim 5, wherein
at the time a ratio between an integrated absolute value of a value obtained by a high-pass filter process on the standard yaw rate and an integrated absolute value of a value obtained by a high-pass filter process on the actual yaw rate is within a predetermined range, the turning characteristic estimating device determines that the estimation values are valid.

16. The turning characteristic estimating device for the vehicle according to claim 1, wherein
at the time the estimation values are determined to be valid, the turning characteristic estimating device updates the stability factor and the time constant coefficient of steering response of the vehicle with the estimation values, and
at the time the estimation values are determined to be not valid, the turning characteristic estimating device resets the stability factor and the time constant coefficient of steering response of the vehicle to states before the turning characteristic estimating device estimates the estimation values used for determination of validity.

17. The turning characteristic estimating device for the vehicle according to claim 16, wherein
at the time an absolute value of a deviation between a value obtained by a high-pass filter process on the standard yaw rate and a value obtained by a high-pass filter process on the actual yaw rate is equal to or more than a predetermined value, the turning characteristic estimating device resets the stability factor and the time constant coefficient of steering response of the vehicle to initial values or updates the stability factor and the time constant coefficient of steering response of the vehicle to intermediate values between the estimation values and the initial values.

18. The turning characteristic estimating device of the vehicle according to claim 16, wherein
at the time a ratio between an integrated absolute value of a value obtained by a high-pass filter process on the standard yaw rate and an integrated absolute value of a value obtained by a high-pass filter process on the actual yaw rate is outside of a predetermined range, the turning characteristic estimating device resets the stability factor and the time constant coefficient of steering response of the vehicle to initial values or updates the stability factor and the time constant coefficient of steering response of the vehicle to intermediate values between the estimation values and the initial values.

19. The turning characteristic estimating device of the vehicle according to claim 1, wherein
at the time the estimation values are determined to be valid, the turning characteristic estimating device sets weighting to the estimation values corresponding to a degree of validity of the estimation values, and updates the stability factor and the time constant coefficient of steering response of the vehicle while reflecting the weighting.

20. A turning characteristic estimating device for a vehicle for estimating a stability factor and a time constant coefficient of steering response that are parameter values related to turning characteristics of the vehicle, wherein
the turning characteristic estimating device changes the stability factor and the time constant coefficient of steering response of the vehicle based on a correlation relationship between a standard yaw rate of the vehicle and an actual yaw rate of the vehicle, the standard yaw rate being calculated by using estimation values of the stability factor and the time constant coefficient of steering response estimated by the turning characteristic estimating device.

* * * * *